United States Patent
Lim et al.

(10) Patent No.: US 8,971,922 B2
(45) Date of Patent: Mar. 3, 2015

(54) APPARATUS AND METHOD FOR MEASURING POSITION OF TERMINAL LOCATED IN INDOOR USING WIRELESS NETWORK

(71) Applicant: LG Electronics Inc., Seoul (KR)

(72) Inventors: Dongguk Lim, Anyang-si (KR); Dongcheol Kim, Anyang-si (KR); Jiwon Kang, Anyang-si (KR); Hangyu Cho, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/959,380

(22) Filed: Aug. 5, 2013

(65) Prior Publication Data

US 2014/0045520 A1 Feb. 13, 2014

Related U.S. Application Data

(60) Provisional application No. 61/679,769, filed on Aug. 5, 2012.

(51) Int. Cl.
*H04W 24/00* (2009.01)
*H04W 4/02* (2009.01)

(52) U.S. Cl.
CPC ................... *H04W 4/023* (2013.01)
USPC .............. 455/456.1; 455/456.5; 455/422.1; 455/12.1; 455/67.11

(58) Field of Classification Search
USPC .......... 455/456.1, 456.5, 422.1, 67.11, 226.1, 455/226.2, 12.1
See application file for complete search history.

(56) References Cited

U.S. PATENT DOCUMENTS

| | | | |
|---|---|---|---|
| 6,944,096 B2 * | 9/2005 | Lemenager et al. | 367/77 |
| 2002/0168989 A1 * | 11/2002 | Dooley et al. | 455/456 |
| 2008/0032705 A1 * | 2/2008 | Patel et al. | 455/456.1 |
| 2012/0026036 A1 * | 2/2012 | Shaw et al. | 342/357.31 |
| 2013/0045754 A1 * | 2/2013 | Markhovsky et al. | 455/456.1 |

* cited by examiner

*Primary Examiner* — Temica M Beamer
(74) *Attorney, Agent, or Firm* — Lee, Hong, Degerman, Kang & Waimey (57) ABSTRACT

A method and apparatus for measuring the position of a terminal located in indoor using a wireless network is disclosed. The method for measuring a position of a terminal located in indoor using a wireless network includes receiving measurement result information obtained by performing measurement with respect to signals from three or more access points (APs), and calculating the position of the terminal using the measurement result information. The measurement result information includes signal strengths measured with respect to signals from a first band and a second band of each of the three APs.

17 Claims, 7 Drawing Sheets

| Frame control | Duraiton ID | Addr 1 | Addr 2 | Addr 3 | Sequence control | Addr 4 | Frame Body | FCS |
|---|---|---|---|---|---|---|---|---|

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs is an IBSS. |
| 10 | TIM | The TIM information element is only present within Beacon frames generated by APs. |

FIG. 6

APPARATUS AND METHOD FOR MEASURING POSITION OF TERMINAL LOCATED IN INDOOR USING WIRELESS NETWORK

Pursuant to 35 U.S.C. §119(e), this application claims the benefit of Provisional Application No. 61/679,769, filed on Aug. 5, 2012, the contents of which are incorporated by reference herein in their entirety.

BACKGROUND OF THE INVENTION

1. Field of the Invention

The present invention relates to positioning, and more particularly, to a method and apparatus for measuring the position of a terminal located in indoor using a wireless network.

2. Discussion of the Related Art

An assisted global positioning system (A-GPS) is a satellite-based positioning system that can under certain conditions (mostly, when a data link with a server is established) improve a GPS startup speed and reduce time to first fix (TTTF) (which is a time taken to fix a data link with an artificial satellite). An A-GPS is mainly used in a user equipment (UE) (e.g., a cellular phone or a smart phone) having a built-in GPS and was developed by Federal Communications Commission in order to transmit location information during 911 emergency calls.

A UE can support location information to a user via A-GPS technologies. A-GPS technologies are location information service technologies that are mainly used in 3rd generation partnership project (3GPP) standard and currently provide many services to subscribers. In simpler terms, the UE receives GPS (which corresponds to A-GNSS in terms of 3GPP) satellite information and transmits or receives location related information of a base station (BS) based on the GPS satellite information to receive accurate location information through a server that manages location information of the BS.

A-GPS technologies have been already used to provide more accurate location information using information received by a UE from a GPS via communication with a server that manages location information of a BS. Recently, A-GPS technologies have been mainly used in fields of wideband code division multiple access (WCDMA) of 3GPP standard or code division multiple access (CDMA) of 3GPP2 standard. In areas where UEs cannot easily receive location information, locations are estimated using satellite information alone, which is disadvantageously less accurate than A-GPS technologies. In addition, time required to acquire location information may be changed according to an area.

From the Cold War with the Soviet Union, the United States launched many artificial satellites out of the earth in order to spy upon the Soviet Union. These satellites periodically transmit location information to the earth at a specific frequency. When a UE receives location information to estimate a location, errors corresponding to several hundred meters may be experienced. Accordingly, for more accurate estimation and error reduction, a UE accesses a location information server of a BS using information received from a GPS to obtain a more accurate location, which is called A-GPS technologies. In general, an error range is reduced within several meters even if accuracy is changed according to a location of a UE within an area managed by a BS.

However, according to these technologies, problems arise in terms of location acquisition when a UE fails to receive GPS signals. Of course, when the UE is located in a building, the UE can receive GPS signals through antennas installed outdoors. However, currently, this reception is significantly limited, and thus, many problems arise in areas where GPS signals cannot be received, such as indoors or underground. In this case, it is very difficult to acquire accurate location information by the UE in reality. In this regard, detailed solutions to these problems have not yet been to be proposed.

SUMMARY OF THE INVENTION

Accordingly, the present invention is directed to a method and apparatus for measuring the position of a terminal located in indoor using a wireless network that substantially obviates one or more problems due to limitations and disadvantages of the related art.

An object of the present invention is to provide a method for measuring the position of a terminal located in indoor using a wireless network.

Another object of the present invention is to provide a method and apparatus for measuring the position of a terminal located in indoor using a wireless network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for measuring a position of a terminal located in indoor using a wireless network includes receiving measurement result information obtained by performing measurement with respect to signals from three or more access points (APs), and calculating the position of the terminal using the measurement result information. The measurement result information includes signal strengths measured with respect to signals from a first band and a second band of each of the three APs. The calculating the position of the terminal may include (a) measuring signals from a first band and a second band of a first AP among the three APs, calculating a distance between the terminal and the first AP per band from the signal strengths per band, and calculating a final distance between the terminal and the first AP using the distances calculated per band; (b) calculating respective final distances between the terminal and the remaining APs except for the first AP among the three APs using the same method as step (a); and (c) calculating the position of the terminal using the respective final distances between the terminal and the three APs calculated in steps (a) and (b) and the positions of the three APs. The final distance between the terminal and the first AP measured in step (a) and the final distances between the terminal and the remaining APs except for the first AP measured in step (b) may be calculated by averaging the distances calculated per band. The final distance between the terminal and the first AP measured in step (a) and the final distances between the terminal and the remaining APs except for the first AP measured in step (b) may be calculated by applying weight factors to the distances calculated per band. If the weight factors are applied to the distances calculated per band, a larger weighting factor value may be applied to a distance calculated from a band in a line of sight (LOS) environment. If the weight factors are applied to the distances calculated per band, a larger weighting factor value may be applied to a distance calculated from a band in which at least one of a signal strength received per band and a delay time satisfies a predefined threshold condition (e.g., large signal strength and a short delay time). In the step of receiving the measurement result information including the signal strength measured with respect to the signals from the first and second bands of each of the three APs, the measurement result information of the first band of each of the three APs is received from the terminal and the measurement result information of the second band of each of the three APs is received from a neighboring terminal located near the terminal. The signal strengths measured with respect to the signals from the first and second bands of each of the three APs included in the measurement result information may be obtained by, at the terminal, accessing the first band, performing measurement, performing band switching, accessing the second band and performing measurement. The signal strengths measured with respect to the signals from the first and second bands of each of the three APs included in the measurement result information may be obtained by, at the terminal, simultaneously accessing the first band and the second band and performing measurement. The method may further include transmitting information including at least one timing information of a measurement time, a measurement result information transmission time and band switching information to the terminal. The band switching information may include information about a band, information about a channel, status information of the channel and channel access time (start or wait) information. Band switching may be performed using a point inter frame space (PIFS) of a contention free period (CFP) or a short inter frame space of a contention period (CP) of a superframe. The position of the terminal may be measured at an AP or a location server.

In another aspect of the present invention, an apparatus for measuring a position of a terminal located in indoor using a wireless network includes a wireless communication unit for receiving measurement result information obtained by performing measurement with respect to signals from three or more access points (APs), and a position information module for calculating the position of the terminal using the measurement result information. The measurement result information includes signal strengths measured with respect to signals from a first band and a second band of each of the three APs. If the position information module calculates the position of the terminal indoors, the location information module may (a) measure signals from a first band and a second band of a first AP among the three APs, calculate a distance between the terminal and the first AP per band from the signal strength measured per band, and calculate a final distance between the terminal and the first AP using the distances calculated per band, (b) calculate respective final distances between the terminal and the remaining APs except for the first AP among the three APs using the same method as step (a), and (c) calculate the position of the terminal using the respective final distances between the terminal and the three APs calculated in steps (a) and (b) and the positions of the three APs. The position information module may calculate the final distance between the terminal and the first AP by averaging the distances calculated per band of the first AP and calculate the final distances between the terminal and the remaining APs except for the first AP among the three APs by averaging the distances calculated per band of the remaining APs. The calculated final distance may be obtained using an average of the distances obtained per band or AP, for example. The final distance between the terminal and the first AP or the final distances between the terminal and the remaining APs except for the first AP may be calculated by applying weight factors to the distances calculated per band. If the weight factors are applied to the distances calculated per band, a larger weighting factor value may be applied to a distance calculated from a band in a line of sight (LOS) environment. If the weight factors are applied to the distances calculated per band, a larger weighting factor value may be applied to a distance calculated from a band in which at least one of a signal strength received per band and a delay time satisfies a predefined threshold condition.

In an indoor positioning method according to various embodiments of the present invention, since the position of the terminal can be more accurately estimated indoors using Wi-Fi using one or more bands, it is possible to increase positioning accuracy.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
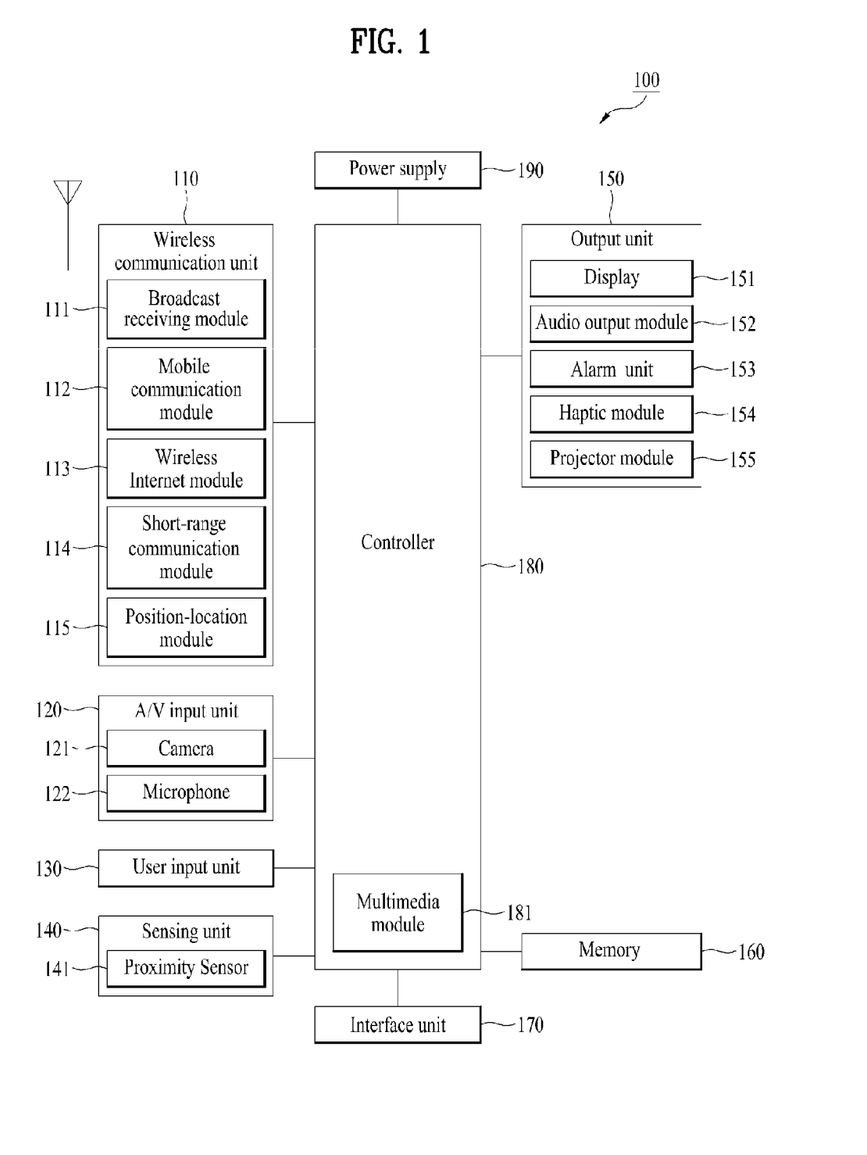
FIG. 1 is a schematic block diagram showing the configuration of a user equipment (UE) 100 according to the present invention.

FIG. 1 is a schematic block diagram showing the configuration of a user equipment (UE) 100 according to the present invention.

The UE 100 may include a wireless communication unit 110, an audio/video (AN) input unit 120, a user input unit 130, a sensing unit 140, an output unit 150, a memory 160, an interface unit 170, a controller 180, a power supply unit 190, etc. When these components are embodied in actual applications, two or more components are combined to constitute one component or one component is divided into two or more components, as necessary.

Although FIG. 1 is a block diagram showing the configuration of the UE according to the present invention, the configuration of the UE is equally applicable to a base station (BS), an access point (AP) and a location server.

Prior to description of the embodiments of the present invention, several positioning methods will be described. As an example of the positioning method, triangulation and fingerprinting will be described.

Figure 2A:
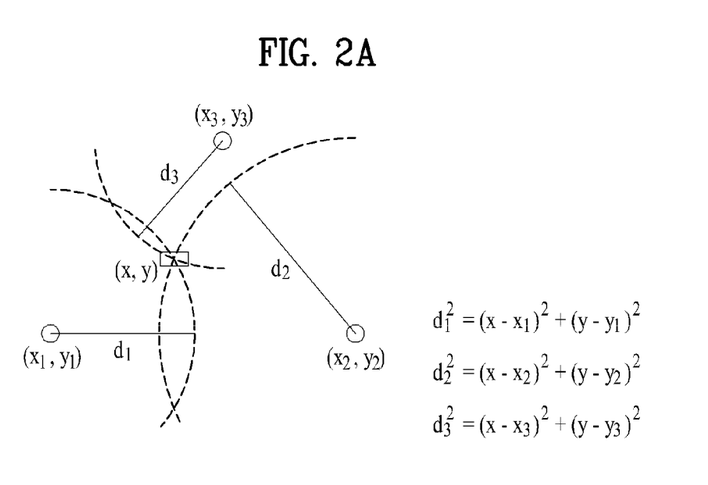
FIG. 2A is a diagram illustrating a triangulation method among several positioning methods and FIG. 2B is a diagram illustrating the concept of time of arrival (TOA)

FIG. 2A is a diagram illustrating a triangulation method among several positioning methods.

In triangulation, at least three reference points are necessary to estimate a real-time position of an object, distances from the at least three reference points are calculated and intersections thereof are detected to perform position estimation, as shown in FIG. 2A. The position (xy, yu) of the terminal (or can be referred as mobile terminal, user equipment and like that) may be calculated through a recursive least squares (LS) method using the equations shown in FIG. 2A. The distance measurement method used in triangulation may be expressed as follows.

RSSI (Received Signal Strength Indication)

A distance between two points may be obtained using Friis's formula as follows.

$$L = 20\log_{10}\left(\frac{4\pi d}{\lambda}\right)[\text{dB}] \quad d = \frac{\lambda}{4\pi} \cdot 10^{\frac{L}{20}} = \frac{c}{4\pi f} \cdot 10^{\frac{L}{20}}$$

Signal transmission times between a plurality of APs, the positions of which are known, and a terminal are measured to calculate the position of the terminal and a distance between an AP and a terminal can be calculated through accurate time synchronization therebetween.

Figure 2B:
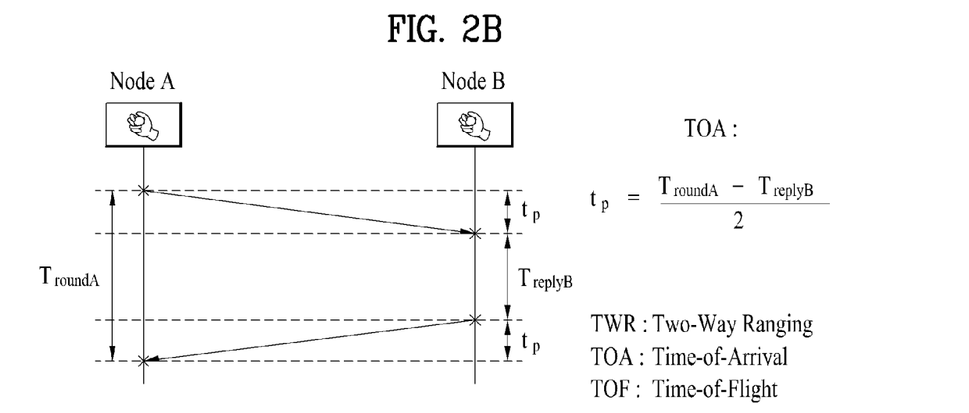

FIG. 2B is a diagram illustrating the concept of time of arrival (TOA).

Referring to FIG. 2B, a time TOA(tp) required when a signal transmitted from a Node A to a Node B arrives may be expressed by $$t_p = \frac{T_{roundA} - T_{replyB}}{2}.$$

$T_{roundA}$ denotes a time required when a packet is transmitted by a transmitter (Node A) to a receiver (Node B) through an arbitrary number of intermediate connections or communication networks and then a response signal thereto arrives at the transmitter (Node A) through the intermediate connections or communication networks.

Figure 3:
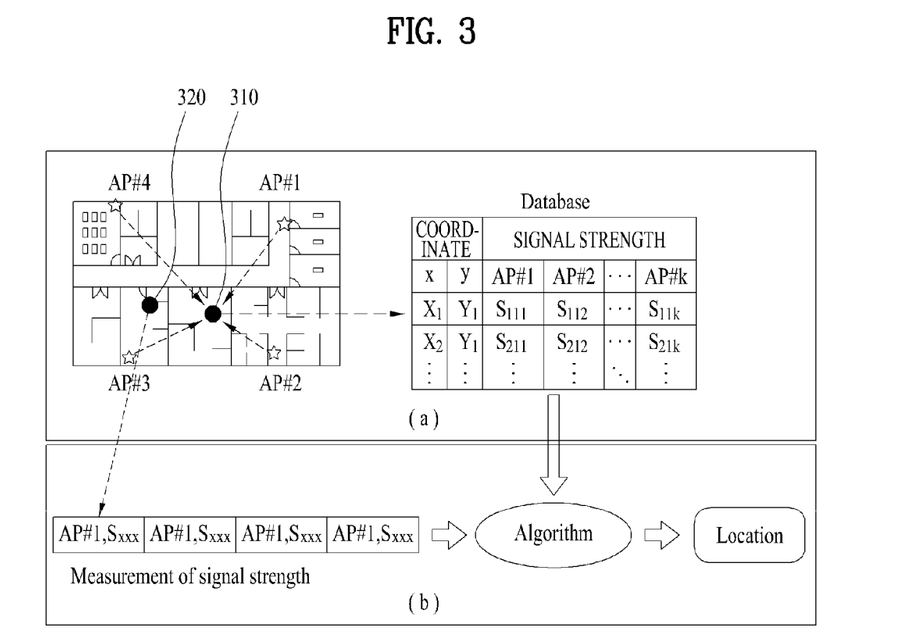
FIG. 3 is a diagram illustrating a fingerprinting positioning method in a Wi-Fi positioning system.

FIG. 3 is a diagram illustrating a fingerprinting positioning method in a Wi-Fi positioning system.

In fingerprinting which is based on empirical data, a region in which the position of the terminal will be measured is divided into sub-regions having a cell shape or another shape and a value of a signal transmitted from an access point (AP) is measured per reference point in each sub-region and is stored in a database. After the received signal is stored in the database, the value of an actually measured signal is compared with the value stored in the database to determine the position of the terminal.

That is, the fingerprinting method may be largely divided into two steps. In a first step, a region in which the position of the terminal will be measured is divided into sub-regions having a specific shape, the strength of a signal transmitted from the AP to a reference point of each sub-region is measured, and data is collected based on the measured signal strength. In a second step, the actual position of the terminal is estimated using a specific algorithm based on the data stored in the database and the actually measured value of the signal transmitted from the AP.

FIG. 3(a) illustrates a signal collection step for position estimation in which the terminal measures the values of the signals received from a plurality of APs (AP1, AP2, AP3 and AP4) at a specific reference point 310 and stores the values in the database. FIG. 3(b) shows a process of estimating the current position of the terminal by applying the strength of the signal from the AP measured at a measurement point 320 and the signal strength stored in the database to the algorithm. The Wi-Fi positioning system using fingerprinting does not require time synchronization for position estimation and accurately performs position estimation indoors because multipath components according to environments are included in the database. However, in the Wi-Fi positioning system using fingerprinting, the database of a service region should be established and the database needs to be updated according to internal environment change (AP movement, etc.). Next, as another positioning method, an inertial positioning method will be described in brief.

Dual Band Wireless Network

Dual band is the capability to transmit on the 5 GHz band of 802.11a and also the 2.4 GHz band used by 802.11b, 802.11g, and 802.11n. Unlike ordinary Wi-Fi equipment that only supports one signal band, dual-band gear contains two different types of wireless radios that can support connections on both 2.4 GHz and 5 GHz links. Dual-band Wi-Fi is a feature of some wireless routers and network adapters.

Dual Band Routers

Unlike ordinary routers that only support one wireless signal band, dual-band routers contain two different types of wireless radios. When first introduced many years ago, dual-band routers supported both 802.11a and 802.11b and were designed for business networks that used a mix of both types of Wi-Fi clients.

Some newer 802.11n Wi-Fi routers also allow simultaneous dual band communication with both 2.4 GHz and 5 GHz clients. By supplying separate network bandwidth for each of the two types of links, these routers provide maximum flexibility in setting up a home network. For example, older 802.11b/g clients can be set to run on the 2.4 GHz side of a simultaneous dual-band router without impacting the performance of 802.11n clients running at 5 GHz.

Dual Band Adapters

Dual-band WiFi network adapters likewise contain two wireless radios. These adapters can be configured to use either 802.11a via one radio, or the 802.11b/g/n family via the other, but not both. Using a dual-band adapter allows a terminal to connect to either type of Wi-Fi access point.

Figure 4:
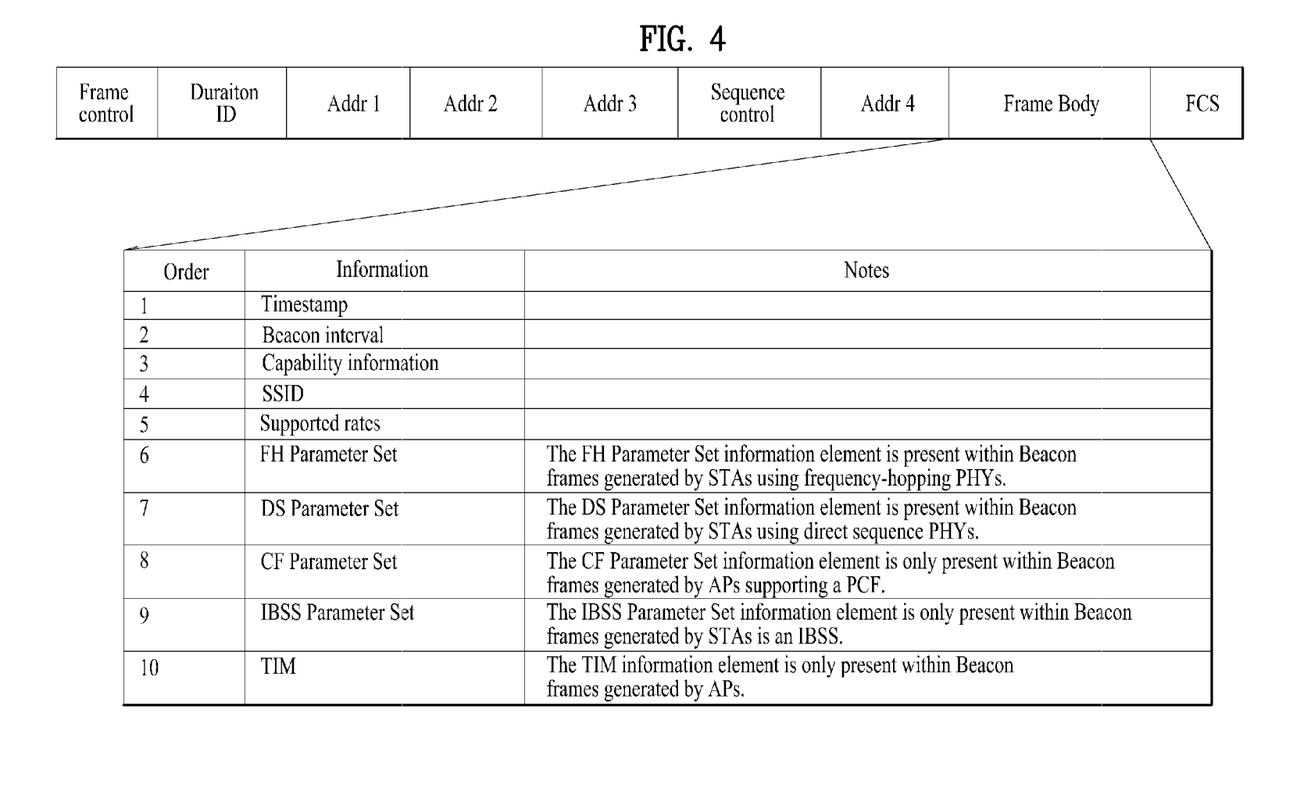
FIG. 4 is a diagram showing a beacon frame used in a Wi-Fi system.

FIG. 4 is a diagram showing a beacon frame used in a Wi-Fi system.

Referring to FIG. 4, the beacon frame includes a frame control field, a duration ID field, an Addr 1 field, an Addr 2 field, an Addr 3 field, a sequence control field, an Addr 4 field, a frame body field and a FCS field. For details of these fields, refer to the IEEE 802.11 standard.

A terminal should access a Wi-Fi system, in order to perform positioning based on a received signal. A process of accessing the Wi-Fi system will be briefly described. The terminal performs scanning in order to access the Wi-Fi system and the scanning method includes a passive scan method (beacon frame reception) and an active scan method (probe request/probe response signal exchange). Thereafter, synchronization is performed using a timestamp included in the beacon frame and an authentication process is performed. After authentication, the terminal accesses the Wi-Fi system through an association process (request/response frame exchange).

A terminal in a dual-band wireless system (e.g., Wi-Fi) may receive a signal from an AP in each band and estimate an indoor position thereof. The present invention proposes a method of performing indoor positioning at a terminal using a dual-band wireless system.

Positioning Method 1 (Positioning Method Using Different Band Information)

In a dual-band (e.g., 2.4 GHz or 5 GH) Wi-Fi system, an AP transmits a beacon frame to a terminal via a channel of each band or transmits/receives a probe request/probe response frame to/from the terminal through the channel of the band, for terminal connection. Accordingly, the terminal having dual band capacity performs scanning with respect to dual band, for connection to the AP.

The terminal may receive a beacon frame which is periodically transmitted via each channel of dual band or transmit a probe request frame via each channel of dual band and receive a probe response from the AP, during scanning. The terminal may confirm channel information of each band and received signal strength through scanning. Accordingly, the terminal having dual band capacity may increase indoor positioning accuracy by performing positioning using the channel information of dual band confirmed through scanning. Hereinafter, a positioning method using information about dual band will be described in detail.

Embodiment 1

Figure 5:
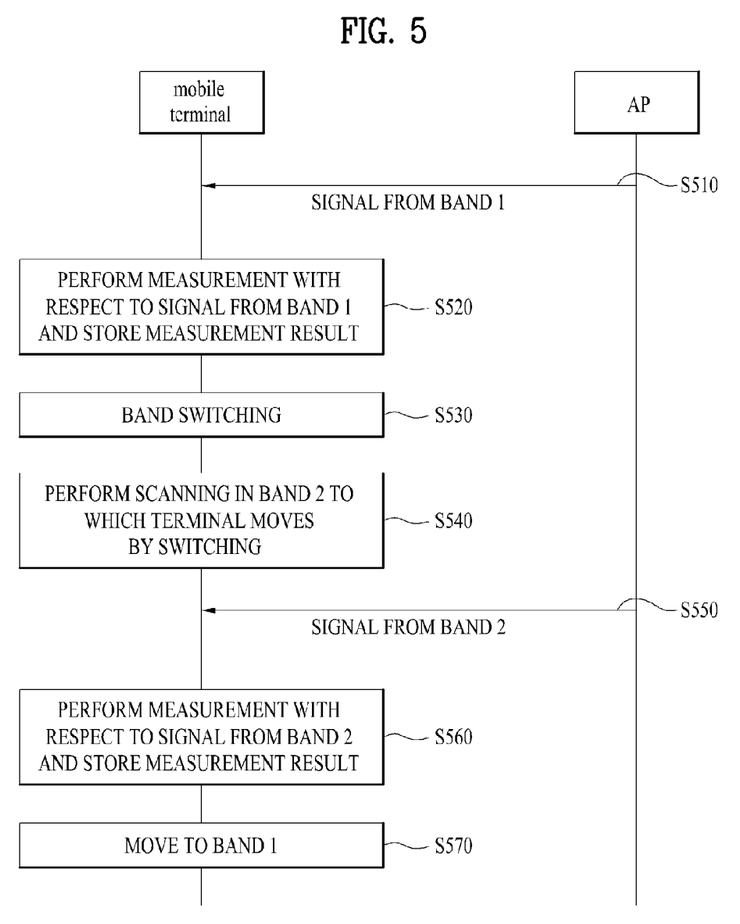
FIG. 5 is a diagram illustrating an indoor positioning method according to Embodiment 1 of the present invention.

Indoor Positioning Method Using Dual Band Information Feedback Through Access Band FIG. 5 is a diagram illustrating an indoor positioning method according to Embodiment 1 of the present invention.

A terminal which performs indoor positioning receives a signal (e.g., a beacon frame, a probe response, data, etc.) from an AP through a channel of an access band (e.g., band 1) (S510). Received signal strength (RSS) of the signal from band 1 is measured and stored in a memory 160 (S520). Information stored in the memory 160 is at least one of a service set identifier (SSID), a received signal strength indicator (RSSI), a band indicator and a channel indicator.

The terminal which has stored the above information in the memory 160 may perform band switching in order to measure an RSS of a signal from another band (e.g., band 2) (S530). At this time, band switching is performed in an inter frame space (IFS) (e.g., a Distributed IFS (DIFS), a PCF IFS (PIFS), a short IFS (SIFS), and an extended IFS (EIFS)) and only the SIFS may be used for fast positioning. In the IEEE 802.11 standard, several IFSs such as a Distributed IFS (DIFS), a PCF IFS (PIFS), a short IFS (SIFS) and an extended IFS (EIFS) are used.

The terminal which moves to another band (e.g., band 2) through band switching within the IFS (e.g., SIFS, DIFS, EIFS or PIFS) may perform scanning in order to measure the signal strength of the signal from the band to which the terminal moves (S540). The terminal receives a beacon frame from the AP or transmits/receives a probe request frame/probe response frame to/from the AP through scanning or measures an RSS and ToA of the channel of each band through data reception (S550 and S560).

If the terminal measures the RSS and the ToA using the beacon frame or the probe request/response frame, the terminal can measure the signal without performing the process of accessing the AP. Therefore, it is possible to reduce latency due to measurement. In contrast, if the terminal accesses the AP through a contention based access process and then measures the RSS in order to measure data transmitted by the AP, an accurate RSS can be measured and latency increases. The terminal stores the RSS information (e.g., RSSI) and ToA measured using such methods in the memory 160. The terminal which has finished measurement of another band (e.g., band 2) performs band switching during the IFS interval and moves to the initially accessed band (e.g., band 1) (S570).

The terminal which has performed band switching accesses the AP through the contention based access process in order to transmit, to the AP, information (including an SSID, an RSSI, a band indicator and a channel indicator) about dual band (e.g., band 1 and band 2) confirmed by measurement. For example, the terminal which has performed band switching using the SIFS confirms a channel status in the band through the DIFS, applies a back-off time to an idle channel, and accesses the AP through the contention based access process. At this time, for fast connection of the terminal, priority is given to a terminal which re-accesses the AP for positioning so as to apply a small back-off time. However, the terminal may not perform a process of re-accessing the AP after band switching if there is a transmission opportunity (TXOP) and may perform measurement without re-access process.

The terminal which has re-accessed the AP transmits dual band information stored in the memory 160 to the AP through the data frame. The measured dual band information may be transmitted using a control frame or a position request frame instead of the data frame. The AP which has received the measured dual band information from the terminal may transmit the information to the location server through a backbone network, a wired network or the Internet or directly obtain the position of the terminal using the information. The positioning method using the dual band information will now be described.

Positioning Using RSSI Based Triangulation (1) Positioning Using Correction of Distance Between AP and Terminal In positioning using correction of a distance between an AP and a terminal, the terminal obtains distances between the AP and the terminal through measurement with respect to dual band and performs distance correction using the obtained values to obtain a final position.

The terminal may measure the RSSI of the signal received from the AP and calculate the distance between the AP and the terminal using the measured value. For example, the distance d between two points may be obtained using Friis's formula as follows.

$$L = 20\log_{10}\left(\frac{4\pi d}{\lambda}\right)[\text{dB}] \quad d = \frac{\lambda}{4\pi} \cdot 10^{\frac{L}{20}} = \frac{c}{4\pi f} \cdot 10^{\frac{L}{20}}$$

where, $c = 3*10^8$ m/s.

Using the above distance calculation equation, the terminal may calculate the distance between the AP and the terminal per band using the RSSI received through each band of the same AP and obtain a final distance between the AP and the terminal through a function ($f(d_1 \cdot d_2)$) using the distance between the AP and the terminal calculated per band. For example, if the distance obtained from the RSSI measured through band 1 (2.4 GHz) is D1 and the distance obtained from the RSSI measured through band 2 (5 GHz) is D2, the function ($f(d_1 \cdot d_2)$) for obtaining the distance between the AP and the terminal may be expressed by Equation 1.

$$\tilde{D} = (f(d_1 \cdot d_2)) = D_1 + D_2/2 \quad \text{Equation 1}$$

The method of calculating the distance between the AP and the terminal is only exemplary and ($f(d_1 \cdot d_2)$ for obtaining the distance may be differently defined. Using the distance information between the AP and the terminal obtained through the dual band information, the position of the terminal may be obtained using a triangulation method as shown in Equation 2.

$$\tilde{D}_1^2 = (x-x_1)^2 + (y-y_1)^2$$

$$\tilde{D}_2^2 = (x-x_2)^2 + (y-y_2)^2$$

$$\tilde{D}_3^2 = (x-x_3)^2 + (y-y_3)^2 \quad \text{Equation 2}$$

Where, $\tilde{D}_1^2$, $\tilde{D}_2^2$ and $\tilde{D}_3^2$ respectively denote distances between AP1, AP2 and AP3 and a terminal and (x, y) corresponds to a final position of the terminal.

(2) Positioning Through Calibration Correction

In positioning through correction of the distance between the AP and the terminal, the distance between the AP and the terminal is calculated per band using the RSSI measured through dual band as shown in Equation 1. The calculated distance may be applied to a triangulation method to obtain the position information of the terminal of each band. The position information of the terminal measured through the above process per band may be applied to a function (f(·)) to obtain a final position of the terminal. For example, if the position information of the terminal obtained using triangulation per band is (x1, y1) and (x2, y2), (f(·)) may be expressed by a function using a mean value of the two pieces of position information and may be expressed by Equation 3 below.

$$(f(\cdot))=f(P_1 \cdot P_2)=f((x_1 \cdot y_1),(x_2 \cdot y_2))=(x_1+x_2/2, y_1+y_2/2) \quad \text{Equation 3}$$

This is only exemplary and (f(·)) may be changed according to a position calculation algorithm.

(3) Positioning Using Weighting Factor

In dual band in which the terminal measures the RSSI, since band 2 (e.g., 5 GHz) is higher than band 1 (e.g., 2.4 GHz) due to frequency properties, a probability that a signal is transmitted and received in a line of sight (LOS) environment is high. Accordingly, since peripheral influence is reduced as compared with a non line of sight (NLOS) environment, it is possible to provide more accurate positioning information. If a weighting factor considering such band properties is set to perform terminal positioning, the set weighting factor (w1, w2) may be applied to measure the position of the terminal. The weighting factor satisfies w1+w2=1. The set weighting factor may be used for (1) the positioning method using correction of the distance between the AP and the terminal and (2) the positioning method using calibration correction.

A high frequency band undergoes much more peripheral interference and influence than a low frequency band. Accordingly, the quality of the signal received via a high frequency band may be low. In this case, if a high weighting factor is applied to the signal received via a high frequency band, error may increase. Accordingly, if the terminal performs measurement with respect to several bands, priority is given to a high frequency band. A determination as to whether a value measured at this time satisfies a predefined threshold is made to perform positioning using only the satisfied value. In addition, the per-band weighting factor may be determined based on the value measured per band. For example, if a signal measured in a high frequency band is inferior to a signal measured in a low frequency band, a weight may be further applied to the weighting factor for the low frequency band to be used for positioning. That is, at least one of the strength of the signal received per band and a delay time is compared with a predetermined threshold (or threshold condition) to determine whether the received signal length is large or the delay time is short and a relatively large weight factor value may be applied to the distance measured from the band satisfying the threshold.

The weighting factor applied per band may be adaptively set by confirming tendencies that the RSS measured by the UE varies during a predetermined period. At this time, the weighting factor may be set by the terminal which measures the RSS or by the AP, the location server or the router based on the RSS information transmitted by the terminal. If the terminal sets the weighting factor, the weighting factor may be immediately used for positioning or transmitted to the AP, the location server or the router to be used at a higher node.

Positioning Using Fingerprinting

The location server or the AP receives the information (e.g., SSID, RSSI, band index and channel index) measured by the terminal through dual band as in the positioning method using the RSSI and uses a function f(band 1, band 2, DB 1, DB 2) in order to calculate the position of the terminal using the received information and the positioning information (SSID, RSSI, band indicator and channel indicator) stored in the database. Here, band 1 and band 2 indicate positioning information (SSID, RSSI, band indicator and channel indicator) confirmed through measurement in each band and DB1 and DB 2 denote per-position positioning information (including SSID, RSSI, band indicator and channel indicator) according to the band, which is pre-stored in order to check the position of the terminal. As an example, calculation of the position of the terminal using the function f(band 1, band 2, DB 1, DB 2) may be expressed as shown in Equation 4.

$$(x, y) = f(\text{band}_1, \text{Band}_2, DB_1, DB_2) = f\left(\frac{x_{b1}+x_{b2}}{2}, \frac{y_{b1}+y_{b2}}{2}\right) = $$
$$f(\text{band}_1(\min(DB_{RSS1}-Mea_{RSS1})),$$
$$\text{band}_2(\min(DB_{RSS1}-Mea_{RSS1}))) \quad \text{Equation 4}$$

where, $x_{b1}$ denotes a coordinate calculated using an x coordinate position confirmed through signal measurement from band 1 and an x coordinate position stored in the database of band 1 and $x_{b2}$ denotes a coordinate calculated using an x coordinate position confirmed through signal measurement from band 2 and an x coordinate position stored in the database of band 2. In addition, $y_{b1}$ denotes a coordinate calculated using a y coordinate position confirmed through signal measurement from band 1 and a y coordinate position stored in the database of band 1 and $y_{b2}$ denotes a coordinate calculated using an x coordinate position confirmed through signal measurement from band 2 and a y coordinate position stored in the database of band 2.

As a result, the final position (x, y) of the terminal obtained using the positioning method using fingerprinting may be expressed by $$\left(\frac{x_{b1}+x_{b2}}{2}, \frac{y_{b1}+y_{b2}}{2}\right).$$

Although the final position (x, y) of the terminal is obtained through averaging, this is only exemplary and f(band 1, band 2, DB 1, DB 2) for calculating the position of the terminal may be variously expressed according to a calculation algorithm.

The position information of the terminal obtained through the above-described method may be calculated by the location server and transmitted to the AP or may be directly calculated by the AP. The position information of the terminal calculated by the location server or the AP is transmitted to the terminal through the AP. The terminal which has received calibrate information of the position from the AP may confirm the position of the terminal through the above-described information.

Embodiment 2

Indoor Positioning Method Through Channel Pairing Between Bands

In Embodiment 1, the method of, at the terminal, measuring the distance between the terminal and the AP using the received signal strength (RSS) of the signal received from the dual band of the AP was described. In Embodiment 2, via which channel of the band the terminal receives a signal to perform positioning is described.

The terminal switches the access band to another band, receives a beacon frame from the AP or transmits a probe request frame to the AP and receives a probe response frame, and measures positioning information. In order to efficiently perform measurement in another band, the terminal may transmit channel information of the band to be measured and channel use timing information to the AP. The channel information of the band to be measured and channel use timing information may be transmitted to the terminal using the following method.

If the terminal transmits the position request frame to the AP, the AP transmits the position response frame in response to the request and transmits the band to be measured through the frame, the channel information and the channel use timing information. In this case, the terminal may perform the same positioning method as Embodiment 1 using the band to be measured, the channel information and the channel use timing information received from the AP.

If the terminal transmits measurement information of the current band for positioning, the AP transmits measurement information of another band to the terminal. At this time, the information may be transmitted via a data frame. The channel of another band for measurement may be predetermined by the terminal according to an access channel or may be flexibly determined by the AP in consideration of the situation of another band when positioning starts and be transmitted to the terminal.

The terminal which has received the measurement information through the above-described method moves to another band through band switching using the same method as Embodiment 1 and performs measurement using the received information. The terminal, which has finished measurement of the accessed band and another band, transmits the information to the AP and acquires the position information of the terminal using the methods shown in Embodiment 1.

Positioning Method 2 (Positioning Method Using PCF)

In order to perform positioning using dual band, the terminal disconnects the accessed band, performs band switching, and performs measurement. Next, the terminal moves to the original band and performs a re-access process. At this time, since the Wi-Fi system is a contention based system, the terminal accesses the AP through contention. Since the terminal re-accesses the AP through contention, the terminal experiences high latency in a position measurement process. In order to reduce such latency, the terminal, which performs position estimation, performs communication with the AP using a point coordination function (PCF) without using an existing distributed coordination function (DCF). A terminal position estimation method using a PCF will now be described.

The terminal transmits the position request frame to the AP to indicate that positioning is performed. At this time, the AP creates a polling list using the information (SSID, position indication, etc.) confirmed through the received request frame. The polling list information is similar to scheduling information indicating when the terminal performs transmission/reception in which band. The AP which has created the polling list broadcasts an AP polling list to terminals located in a base station system (BSS). The polling list may be created per band or one polling list may include dual band. The terminal may perform measurement and feedback operation during a contention free period (CFP) of a superframe included in the polling list and perform band switching using a point inter frame space (PIFS) in a CFP. Accordingly, the terminal which has received the polling list receives a beacon frame and a traffic indication map (TIM) transmitted in the CFP in an access band, receives a signal from the AP, measures an RSS and transmits measurement result information to the AP.

The terminal which has performed feedback performs band switching to move to another band, receives a beacon frame and a TIM from the AP during the CFP, measures an RSS, and feeds the information back to the AP using a predetermined period. The terminal which has performed measurement and feedback for another band performs band switching using a PIFS in a CP/CFP and rapidly re-accesses the AP without contention. The AP which has received the measurement information of each band from the terminal transmits the received information to the location server via the Internet, a wired network or a backbone network. The location server may calculate the position of the terminal using the received information or the AP may directly calculate the position of the terminal using the information. The location server or the AP may calculate the position of the terminal using the methods described in Embodiment 1 in order to estimate the position of the terminal.

Embodiment 3

Positioning Method 3 (Positioning Method Simultaneously Using Dual Band)

In Embodiment 1 and Embodiment 2, the terminal performs band switching and performs measurement per band in order to estimate the RSS for dual band. In Embodiment 3 of the present invention, a terminal simultaneously performs measurement with respect to dual band.

Figure 6:
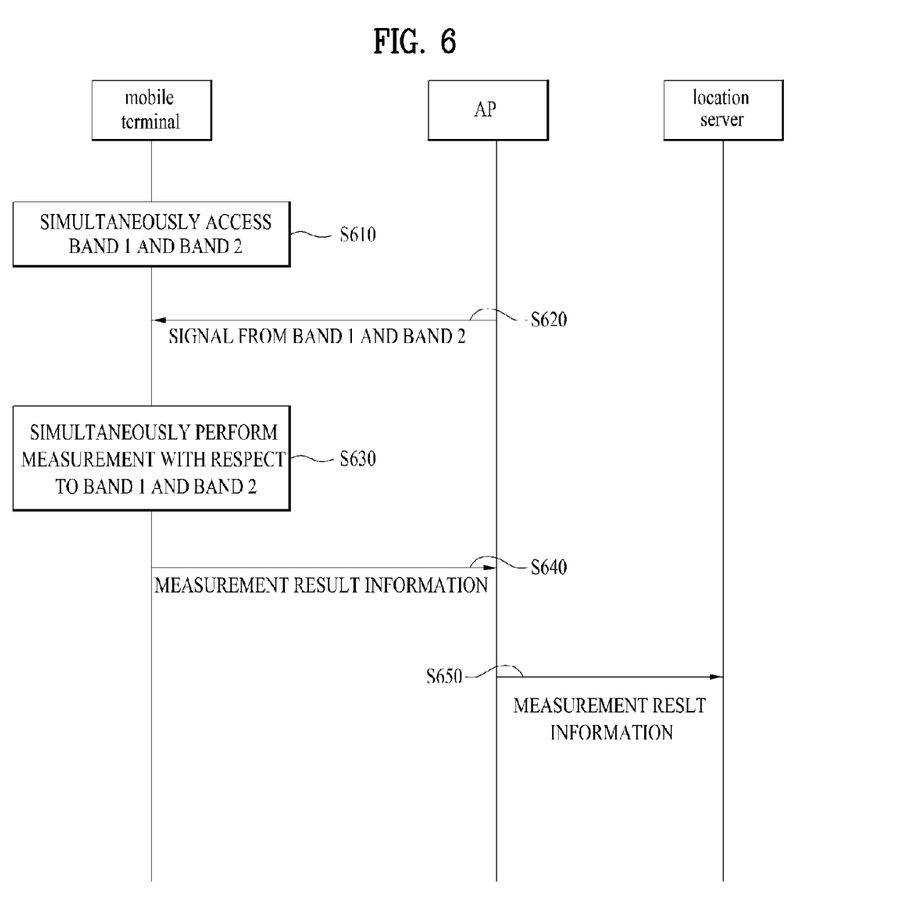
FIG. 6 is a diagram illustrating an indoor positioning method according to Embodiment 3 of the present invention.

FIG. 6 is a diagram illustrating an indoor positioning method according to Embodiment 3 of the present invention.

In the indoor positioning method according to Embodiment 3 of the present invention, since switching for band measurement is not performed, it is possible to reduce positioning delay/latency.

The terminal simultaneously accesses two bands (e.g., band 1 and band 2) (S610) and receives signals from the two bands (S620). The terminal simultaneously performs measurement with respect to two bands (e.g., band 1 and band 2) using the signals received from the two bands (S630).

Thereafter, the SSID, RSS information, channel indication and band indication information acquired by measuring the signals from the two bands are transmitted to the AP (S640). At this time, the information about the two bands may be transmitted using one band and information about each band may be transmitted to the AP through each band. The AP which has received the measurement result information from the terminal may transmit the measurement result information to the location server (S650).

The location server may calculate the position of the terminal using the measurement result information received from the AP and transmits the position of the terminal to the AP. Alternatively, the AP may directly calculate the position of the terminal using the measurement result information. At this time, the method of calculating the position of the terminal at the location server or the AP may be performed according to any one of the above-described embodiments.

Embodiment 4

Positioning Method 4 (Indoor Positioning Method Using a Collaborative Terminal)

In the indoor positioning methods of the terminal according to Embodiments 1 to 3, one terminal performs measurement with respect to dual band and performs positioning. In Embodiment 4 of the present invention, unlike Embodiments 1 to 3, the terminal may perform positioning through collaboration with a collaborative terminal That is, the terminal which performs positioning performs measurement with respect to one band (e.g., band 1) and receives information about another band (e.g., band 2) from the neighboring collaborative terminal.

Accordingly, the terminal may transmit the measurement result information and the information received from the collaborative terminal to the AP, the router or the location server and the AP, the router or the location server may calculate the position of the terminal using the measurement result information. Alternatively, the terminal may directly calculate the position thereof using the measurement result information. As a method of estimating the position of the terminal using the value measured with respect to different bands, the above-described methods are applicable.

The indoor positioning methods of the terminal according to various embodiments of the present invention may be performed by the AP, the location server or the router and the position of the terminal may be transmitted to the terminal, as described above. Alternatively, the terminal may directly calculate the position thereof using the proposed method and algorithm without the AP, the location server or the router.

As described above, in the present specification, a method of measuring received signal strength through dual band and estimating the position of a terminal is proposed. The positioning method proposed by the present invention is applicable to an algorithm for calculating the position of the terminal using a ToA and ToD confirmed through the signal transmitted through dual band to estimate the position of the terminal.

Although the method using dual band has been described in the present invention, the same method is applicable to wireless LAN or Wi-Fi using one or more bands. The number of bands is not limited to 2 and the present invention is applicable to a system having three or more bands. A Wi-Fi system used for positioning in the present invention is only exemplary and a wireless system used in the present invention is not limited to Wi-Fi.

In an indoor positioning method according to various embodiments of the present invention, since the position of the terminal can be more accurately estimated indoors using Wi-Fi using one or more bands, it is possible to increase positioning accuracy.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for measuring a position of a terminal located in indoor using a wireless network, the method comprising:
   receiving measurement result information obtained by performing measurement with respect to signals from three or more access points (APs); and
   calculating the position of the terminal using the measurement result information,
   wherein the measurement result information includes signal strengths measured with respect to signals from a first band and a second band of each of the three APs,
   wherein the measurement result information of the first band of each of the three APs is received from the terminal, and
   wherein the measurement result information of the second band of each of the three APs is received from a neighboring terminal located near the terminal.

2. The method according to claim 1, wherein the calculating the position of the terminal includes:
   (a) measuring signals from a first band and a second band of a first AP among the three APs, calculating a distance between the terminal and the first AP per band from the signal strengths per band, and calculating a final distance between the terminal and the first AP using the distances calculated per band;
   (b) calculating respective final distances between the terminal and the remaining APs except for the first AP among the three APs using the same method as step (a); and
   (c) calculating the position of the terminal using the respective final distances between the terminal and the three APs calculated in steps (a) and (b) and the positions of the three APs.

3. The method according to claim 2, wherein the final distance between the terminal and the first AP measured in step (a) and the final distances between the terminal and the remaining APs except for the first AP measured in step (b) are calculated by averaging the distances calculated per band.

4. The method according to claim 2, wherein the final distance between the terminal and the first AP measured in step (a) and the final distances between the terminal and the remaining APs except for the first AP measured in step (b) are calculated by applying weight factors to the distances calculated per band.

5. The method according to claim 4, wherein, if the weight factors are applied to the distances calculated per band, a larger weighting factor value is applied to a distance calculated from a band in a line of sight (LOS) environment.

6. The method according to claim 4, wherein, if the weight factors are applied to the distances calculated per band, a larger weighting factor value is applied to a distance calculated from a band in which at least one of a signal strength received per band and a delay time satisfies a predefined threshold condition.

7. The method according to claim 1, wherein the signal strengths measured with respect to the signals from the first and second bands of each of the three APs included in the measurement result information are obtained by, at the terminal, accessing the first band, performing measurement, performing band switching, accessing the second band and performing measurement.

8. The method according to claim 1, wherein the signal strengths measured with respect to the signals from the first and second bands of each of the three APs included in the measurement result information are obtained by, at the terminal, simultaneously accessing the first band and the second band and performing measurement.

9. The method according to claim 7, further comprising transmitting information including at least one timing information of a measurement time, a measurement result information transmission time and band switching information to the terminal.

10. The method according to claim 9, wherein the measurement time and the measurement result information transmission time is a contention free period (CFP) of a superframe.

11. The method according to claim 9, wherein the band switching information includes at least one of a band to be switched, information about a channel, status information of the channel and channel access time information and band switching is performed via the channel at the channel access time.

12. The method according to claim 1, wherein the position of the terminal is measured at an AP or a location server.

13. An apparatus for measuring a position of a terminal located in indoor using a wireless network, the apparatus comprising:

a wireless communication unit for receiving measurement result information obtained by performing measurement with respect to signals from three or more access points (APs); and a position information module for calculating the position of the terminal using the measurement result information, wherein the measurement result information includes signal strengths measured with respect to signals from a first band and a second band of each of the three APs, wherein the measurement result information of the first band of each of the three APs is received from the terminal, and wherein the measurement result information of the second band of each of the three APs is received from a neighboring terminal located near the terminal.

14. The apparatus according to claim 13, wherein the position information module calculates the final distance between the terminal and the first AP by averaging the distances calculated per band of the first AP and calculates the final distances between the terminal and the remaining APs except for the first AP among the three APs by averaging the distances calculated per band of the remaining APs.

15. The apparatus according to claim 13, wherein the final distance between the terminal and the first AP or the final distances between the terminal and the remaining APs except for the first AP are calculated by applying weight factors to the distances calculated per band.

16. The apparatus according to claim 15, wherein, if the weight factors are applied to the distances calculated per band, a larger weighting factor value is applied to a distance calculated from a band in a line of sight (LOS) environment.

17. The apparatus according to claim 15, wherein, if the weight factors are applied to the distances calculated per band, a larger weighting factor value is applied to a distance calculated from a band in which at least one of a signal strength received per band and a delay time satisfies a predefined threshold condition.

* * * * *